United States Patent Office 3,103,795
Patented Sept. 17, 1963

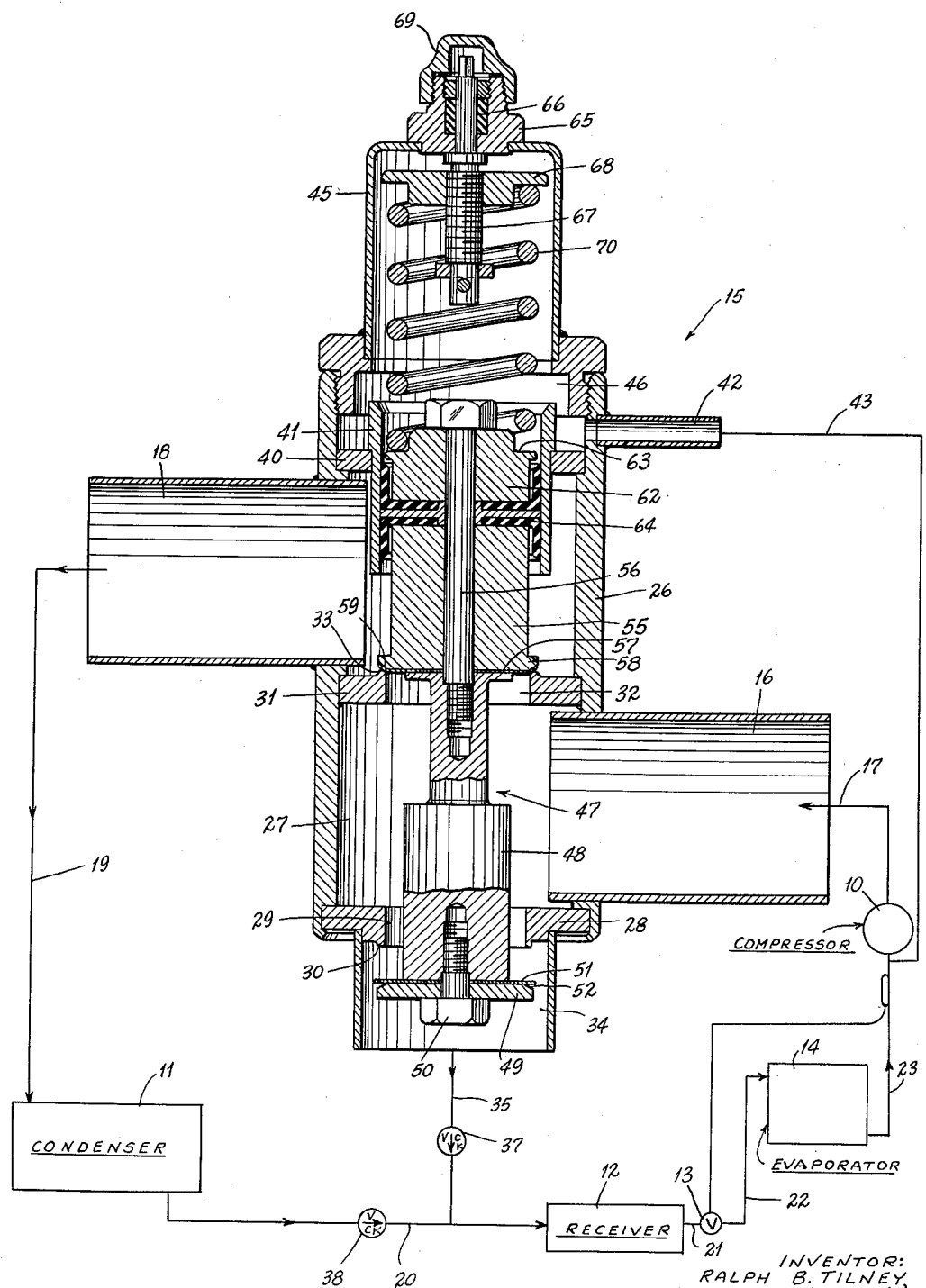

3,103,795
CONDENSER PRESSURE REGULATING SYSTEM
Ralph B. Tilney, Clayton, Mo., assignor to Alco Valve Company, St. Louis, Mo., a corporation of Missouri
Filed May 8, 1961, Ser. No. 108,343
6 Claims. (Cl. 62—196)

This invention relates to a condenser pressure regulator for use in a refrigerating cycle having a compressor, a condenser, a receiver, an expansion device, and an evaporator piped in series; and further relates to a condenser pressure regulator having a piston-type valve that operates in response to pressure differences between the high and low pressure sides of the refrigeration cycle to maintain a minimum pressure difference between the upstream and downstream sides of the expansion device; and the invention especially relates to a condenser pressure regulator having means for preventing damage to the regulator valve and for preventing "pumping" of liquid refrigerant from the receiver back to either the condenser inlet or the condenser outlet when the refrigeration cycle is not in operation.

In this inventor's copending application for United States Letters Patent Serial No. 843,819, filed October 1, 1959, now Patent No. 3,060,699, there is described a condenser pressure regulator system of the kind to which the present invention pertains. Thus, in both the prior and the present applications, there is a refrigeration system including a compressor, a condenser, a receiver, an expansion device, and an evaporator, all piped in series as is conventional. The condenser pressure regulator includes a regulator valve having an inlet port connected to the compressor outlet or discharge line. The regulator valve has a valve chamber with a valve member that is movable therein between opposite positions for connecting the valve inlet port alternately to two outlet ports and to intermediate positions therebetween. One of the valve outlet ports is connected to the condenser inlet and the other valve outlet port is connected to a condenser bypass pipe that, in turn, is connected to the condenser outlet pipe. The refrigerant pressure within this bypass pipe acts upon the valve member to move it in a direction that will open the outlet port leading to the bypass pipe and close the outlet port leading to the condenser. In addition, there is a pressure impulse line connected from the compressor suction pipe to the valve chamber. The pressure within the impulse line acts upon the valve member in opposition to the pressure in the bypass line. Also, there is a compression spring that operates with the impulse line pressure to move the valve member in a direction to close the bypass port and open the other part to the condenser.

This condenser pressure regulator has been highly satisfactory while the refrigeration system is operating, insofar as the regulation of pressures in the condenser and across the expansion device is concerned. But, under certain operating conditions, when the refrigeration system is stopped, the condenser pressure regulator has produced problems.

For example, when the refrigeration system has been operating under conditions in which the temperature of the condenser is moderately cool, the three-way valve member has assumed position intermediate the outlet ports with some refrigerant flowing through the condenser and some bypassing the condenser. Then, when the refrigeration system is stopped, the valve member will remain in that immediate position. If at that time the temperature at the receiver is greater than the temperature at the condenser, there will be a reverse flow or "pumping" of refrigerant from the receiver back through the bypass line into the bypass line outlet port, through the threeway valve and out the outlet port leading to the condenser inlet. This reverse flow of refrigerant from the receiver to the condenser inlet will continue either until the pressures at the condenser and the receiver have equalized, or until the temperature at the condenser drops and the valve member closes against that valve seat which blocks the flow of refrigerant from the compressor to the condenser.

The three-way valve used in the condenser-pressure regulator system has had a poppet for seating against each valve seat. These poppets were designed to withstand fluid-flow in one direction, but were not designed for fluid-flow in the reverse direction. After the operation of the refrigeration system, having incorporated into it the condenser-pressure regulator, it was discovered that these poppets were bent and deformed. It was suspected that there was leaking across the bypass port but the precise reason for the deformation of the poppets was not fully understood. Experiments were made until it was discovered that a check-valve placed in the bypass line eliminated the damage to the three-way valve.

This invention, therefore, incorporates broadly the invention disclosed in the prior Tilney application already mentioned, but adds to that system a check valve in the bypass line for preventing the flow of refrigerant from the receiver back through the bypass line and to the condenser inlet.

It is, therefore, a principal object of this invention to provide a refrigeration system with a condenser pressure regulator for conducting the flow of refrigerant from the compressor to the condenser and to a pipe that bypasses the condenser with check-valve means for preventing reverse flow of refrigerant through the bypass line.

Another object of the invention is to provide a condenser pressure regulator for a refrigeration system that employs a piston-type valve with means for preventing damage and deformation to the valve closing parts of the valve.

It has been found that another drawback of the reverse refrigerant flow from the receiver to the condenser inlet has been the elimination of the quick start features of the refrigeration cycle. Hence, another object of the invention is to provide a means for assuring the quick and certain starting of the refrigeration system.

Other objects and advantages will be apparent to those skilled in the art.

The drawing is a schematic view of a refrigeration system incorporating the condenser pressure regulator and the check valve, with the three-way regulator valve shown in large longitudinal section.

Referring to the drawing in detail, the refrigeration system includes a compressor 10, a condenser 11, a receiver 12, an expansion device 13, and an evaporator 14. Interposed between the compressor and the condenser is a three-way valve 15. The valve 15 has an inlet port 16 which is connected by a pipe 17 to the discharge side of the compressor. One outlet port 18 from the three-way valve 15 is connected by a pipe 19 to the condenser inlet. The condenser outlet 11 is connected by a pipe 20 to one side of the receiver 12. The other side of the receiver 12 is connected by a pipe 21 to the inlet port of the expansion valve 13. The outlet port from the expansion valve 13 is connected by a pipe 22 to the evaporator inlet. Finally, the evaporator outlet 14 is connected by a pipe 23 to the suction side of the compressor 10.

The three-way valve 15 has a side wall 26 part of which (the lower part in the drawing) defines the wall of a valve chamber 27. The valve chamber 27 has an end wall 28 with an opening 29 through it that communicates with the valve outlet port 18. The opening 29 is surrounded by a valve seat 30. The other end 31 of the valve chamber 27 has an opening 32 through it, with a valve seat 33 surrounding the opening 32. The valve inlet 16 is connected through the side wall 26 of the housing and communicates with the valve chamber 27.

A bypass port 34 is connected to the end wall 28. The bypass port 34 communicates with the valve seat 30 and the opening 29 to the chamber 27. The bypass port 34 is connected by a pipe 35 to the pipe 20 leading from the condenser to the receiver. There is a check valve 37 in the pipe 35 that permits the free flow of refrigerant in a direction from the valve outlet port 34 toward the pipe 20, but prevents flow in the reverse direction. Another check valve 38 in the pipe 20 between the condenser and the juncture between the pipes 20 and 35 permits refrigerant to flow only in the direction from the condenser toward the receiver.

The outlet port 18 extends through the side wall 26 of the housing and communicates with the valve seat 33 and the opening 32 to the chamber 27.

On the side of the outlet port 18 opposite the wall 31, there is a ring 40 welded to the side wall 26. The ring 40 supports a cylindrical sleeve 41. The sleeve 41 is coaxial with the axis of the side wall 26 of the housing. A small fluid port 42 is connected through the side wall 26 of the housing on the side of the ring 40 opposite the outlet port 18. The port 42 is connected by a pipe 43 to the compressor suction pipe 23.

An end cap 45 is threaded onto the side wall 26 of the housing adjacent the impulse port 42. The end cap 45 cooperates with the housing to define an impulse chamber 46. The impulse port 42 communicates with the impulse chamber 46.

A piston assembly 47 is slidable within the valve housing. The piston assembly 47 includes a slide 48 onto the end of which is fastened a plate 49 by a bolt 50. A thin metal plate 51 is clamped between the plate 49 and the slide 48 and the outer edge 52 of the plate 49 is beveled. The beveled edge 52 corresponds in position to the valve seat 30 so that when the slide 48 is moved toward the valve seat 30, the thin metal plate 51 first engages the seat 30.

The other side of the slide 48 is connected to a cylindrical block 55 by a long rod 56 that is threaded into the slide 48. A thin metal plate 57 is pressed and held in place between the end of the slide 48 and the base of the cylindrical block 55.

The cylindrical block 55 has a peripheral rim 58 at its end nearest the slide 48 and the outer edge 59 of the rim 58 is beveled. This beveled rim 59 is positioned opposite the valve seat 33.

The bolt 56 also secures a spring-seat block 62, the block 62 having an annular spring-seat 63 on its side furthest from the valve chamber 27. There is a cylindrical seal 64 mounted upon the bolt 56 between the block 55 and the block 62, and this seal 64 makes continual sealing contact with the inner surface of the sleeve 41, regardless of the position of the piston assembly 47.

An adjustable spring-seat mount 65 is welded to the end cap 45. The mount 65 has a bushing 66 that supports a shaft 67. A spring seat 68 is threaded onto the end of the shaft 67. The spring seat 68 can be rotated on the shaft 67 to adjust its position. There is a cover 69 threaded onto the end of the spring-seat mount 65. A compression spring 70 bears at one end against the spring seat 68 and at the other end against the spring seat 63 on the block 62. This compression spring 70 biases the piston assembly 47 in a downward direction as viewed in the drawing and therefore urges the piston face 59 toward the valve seat 33 to close the passage between the inlet port 16 and the condenser outlet port 18.

*Operation*

Under normal operating conditions the temperature surrounding the condenser 11 is relatively warm. Hence, the pressure of the refrigerant within the pipe 20, and within the pipe 35, is relatively high. This high pressure within the pipe 35 acts upon the face of the plate 49 and upon the head of the bolt 50, tending to move the piston assembly 47 in an upward direction, as viewed in the drawing, to close the valve face 51 against the valve seat 30.

This pressure within the pipe 35 is opposed by the force of the spring 70. It is also opposed by the pressure within the pipe 43 which is about equal to the pressure in the compressor suction pipe 23. Since the pressure drop between evaporator inlet and outlet is low, and is substantially constant, this impulse pressure in the pipe 43 is a fairly accurate measure of the fluid pressure at the expansion valve outlet. Under these normal operating conditions, the force of the spring 70 and the pressure within the pipe 43, acting upon the adjacent face of the block 63 and the head of the bolt 56, are insufficient to overcome the pressure of the refrigerant within the pipe 35 acting upon the face of the plate 49 and the head of the bolt 50. Therefore, the piston assembly 47 moves to close the valve port 29 and open the valve port 32. The cycle of refrigerant flow is then from the compressor through the pipe 17 to the inlet port 16, through the valve chamber 27, out the valve port 18 to the pipe 19 and to the condenser 11. From the condenser, the refrigerant flows successively to the receiver 12, the expansion device 13, the evaporator 14, and back to the compressor 10.

As the atmosphere surrounding the condenser 11 cools, the pressure within the condenser drops. This causes the pressure of the refrigerant within the pipes 20 and 35 to drop, thereby reducing the pressure against the face of the plate 49, and the head of the bolt 50. If this pressure drops low enough, it will be insufficient to maintain the uppermost position of the piston assembly 47 against the pressure of the spring 70 and the fluid within the valve chamber 46, as determined by the pressure in the compressor suction line 23.

Consequently, the piston assembly will be forced in a downward direction with the plate 51 moving away from the valve seat 30 and the plate 57 moving toward the valve seat 33. If the pressure in the condenser outlet pipe 20 is low enough, its effect upon the piston assembly 47 will be ineffective to prevent the piston assembly from closing against the valve seat 33 under the influence of the spring 70 and the pressure from the impulse line 43. Then all the refrigerant entering the valve chamber 27 will leave through the port 34 and bypass the condenser. While the condenser is bypassed it cannot introduce its condensing pressure drop so the refrigerant that reaches the expansion device is at a higher pressure. Therefore, the expansion device, which requires at least a minimum pressure difference between its inlet and outlet, can operate properly.

As the refrigerant system operates with the condenser bypass, the total refrigerant pressure begins to build up with the rate of increase of pressure within the compressor discharge pipe 17 (and the valve chamber 27 and pipe 35) greater than the rate of increase in refrigerant pressure within the compressor suction pipe 23. Thereafter, as the pressure effects upon the opposite sides of the piston assembly 47, namely, the bypass line pressure opposing the spring and impulse line pressures, become equal, the valve assembly 47 will begin to modulate between its extreme conditions and refrigerant will flow through both the outlet ports 18 and 34. In this manner, the valve 15 responds to the pressure difference upstream and downstream of the expansion device to regulate the flow of refrigerant to the condenser 11 and to the pipe 35 that bypasses the condenser.

From the foregoing, it can be seen that there are various condenser temperature conditions (and various conditions of pressure differentials on opposite sides of the expansion device 13) under which both the valve port openings 29 and 32 are open. Without the check valve 37, if the refrigeration system is turned off under any of these conditions, there is a flow path available between the bypass pipe 35 and the pipe 18 leading to the condenser. And if the pressure of the refrigerant within the receiver is greater than the condenser pressure, refrigerant will "pump" from the receiver to the condenser.

The valve assembly 47 is formed with two thin plates 51 and 57 to provide quick and positive seating against the valve seats 30 and 33. These thin plates 51 and 57 are supported on one side by the plate 49 and the face of the block 55 and are not damaged when the fluid flow is in a direction tending to press the plates 51 and 57 against their supports. However, when the fluid flows in the opposite direction from normal, through either valve port opening 29 or 32, the thin plates 51 and 57 can be deformed. Specifically, when the refrigeration system is not operating and refrigerant "pumps" from the receiver through the bypass pipe 35, into the valve chamber 27 and through the pipe 18 to the condenser, the refrigerant bends the thin plate 51 away from the plate 49.

The purpose of the check valve 37 is to prevent this "pumping" or reverse flow through the bypass pipe 35. The check valve allows refrigerant to pass from the regulator valve toward the receiver, but inhibits flow in the reverse direction. Therefore, when the refrigeration system is shut off, refrigerant cannot migrate from the receiver to the condenser inlet even though the piston assembly 47 occupies an intermediate position between the valve seats 30 and 33.

Another advantage in the check valve 37 is that it prevents the exhaustion of refrigerant from the compressor suction line. Without the check valve 37, this "pumping" of refrigerant from the receiver would reduce the pressure on the high side of the expansion valve so that upon subsequent start-up of the compressor, the expansion valve could not operate properly. The compressor would then start and stop intermittently until a sufficient pressure accumulated at the inlet to the expansion valve. The check valve 37 effectively blocks this outflow of high-side pressure.

Of course, the check valve 38 cooperates with the check valve 37 to completely block the reverse flow of refrigerant from the receiver. If desired, these check valves 37 and 38 could be replaced by a single check valve connected into the pipe 20 between the receiver 12 and the juncture of the pipes 20 and 35.

Various changes and modifications may be made within the process of this invention as will be readily apparent to those skilled in the art. Such changes and modifications are within the scope and teaching of this invention as defined by the claims appended hereto.

What is claimed is:

1. In a refrigeration system having a compressor, a condenser, a receiver, an expansion device and an evaporator piped in series, a condenser pressure regulator comprising a valve connected into the pipe between the compressor outlet and the condenser inlet, the valve having an inlet port for receiving refrigerant fluid from the compressor, a first outlet port for delivering refrigerant to the condenser and a second outlet port, the second outlet port being connected to the pipe between the condenser and the receiver, piston means in the valve for alternately opening one valve outlet and closing the other, means for biasing the piston means in a direction to close the first outlet port, an impulse pipe connected to the valve and to a point downstream of the expansion device, means to cause the piston means to be movable in response to the difference between the pressure in the bypass port and the pressure in the impulse pipe, and check valve means for preventing the flow of fluid from the receiver to the valve.

2. In a refrigeration system having a compressor, a condenser, a receiver, an expansion device and an evaporator piped in series, a condenser pressure regulator comprising valve means, a valve chamber with an inlet and two outlets, the inlet being connected to receive the high pressure refrigerant from the compressor discharge, one of the outlets being connected to the condenser inlet, the other outlet being connected to the receiver inlet, piston means slidable between positions for alternately establishing communication between the valve inlet port and one of the valve outlet ports while blocking communication between the valve inlet port and the other valve outlet port, the piston means having a face that is subjected to condenser inlet pressure for biasing the piston means toward a position for establishing communication between the valve inlet and the valve outlet that is connected to the condenser inlet while blocking communication between the valve inlet and the other valve outlet, the piston means having another face that is subjected to refrigerant pressure at the outlet of the expansion device for biasing the piston means toward a direction for establishing communication between the valve inlet and the valve outlet that is connected to the receiver inlet while blocking communication between the valve inlet and the other valve outlet, additional means for biasing the piston means toward the last mentioned position, means for causing the piston means to move in response to changes in the aforesaid pressure, and means for preventing the flow refrigerant from the receiver to the regulator valve means.

3. In a refrigeration system having a compressor, a condenser, a receiver, an expansion device and an evaporator, piped in series, a condenser pressure regulator comprising a three-way valve having a valve chamber, an inlet port and first and second outlet ports opening into the valve chamber, first and second valve seats associated with the first and second valve ports, respectively, piston means having first and second elements for seating against the first and second valve seats in response to movement of the piston, the valve inlet port being connected to the compressor discharge pipe, the first valve outlet port being connected to the condenser inlet pipe, and the second valve outlet port being connected to the condenser outlet pipe, the piston means being movable in response to an increase in pressure at the first outlet port to seat the second element on the second valve seat, an impulse line connected between the three-way valve and the low pressure side of the refrigeration system, the piston means being movable in response to an increase in pressure in the impulse line to seat the first element against the first valve seat, means biasing the piston means toward the first valve seat, and means for preventing refrigerant flow from the receiver to the condenser inlet when both valve outlet ports are open.

4. In a refrigeration system of the type having a compressor, a condenser, an expansion device, a receiver, and an evaporator connected in a closed series circuit, a bypass pipe from an inlet pipe into the condenser to the outlet side of the condenser upstream of the expansion device whereby refrigerant fluid may flow through the condenser and fluid may bypass the same; valve means for controlling flow of the refrigerant to increase the proportion of refrigerant bypassing the condenser to that flowing through it, whereby to effect decrease in condensing capacity of the condenser and maintenance of condenser pressure; and pressure-responsive means oppositely connected to points in the circuit above and below the expansion device to position the valve means as opposite functions of pressure upstream of the expansion device and pressure downstream thereof, the pressure-responsive means positioning the valve to increase the flow through the condenser upon increase of pressure upstream of the expansion device, additional means biasing the valve to decrease the flow through the condenser, and check valve means to prevent fluid from flowing from upstream of the expansion device to the condenser inlet.

5. In a refrigeration system of the type having a compressor, a condenser, receiver, an expansion device, and an evaporator connected in a closed series circuit, a bypass pipe from an inlet pipe into the condenser to the outlet side of the condenser upstream of the expansion device whereby refrigerant fluid may flow through the condenser and fluid may bypass the same; valve means controlling flow of refrigerant through at least one of the said pipes, pressure-responsive means movable to position the valve means, the pressure-responsive means being moved in one direction in response to rise in pressure upstream of the expansion device, and being moved in the opposite direction in response to rise in pressure downstream of the expansion device; means opposing the upstream pressure for biasing the pressure-responsive means away from said one direction, the pressure-responsive means being connected with the valve means to cause decrease in flow of refrigerant through the condenser inlet pipe when the pressure upstream of the expansion device declines, and check valve means to prevent fluid from flowing through the bypass pipe from the downstream side of the condenser to the upstream side of the condenser.

6. A control system for a refrigeration circuit comprising a compressor, a condenser, a receiver, an expansion device, and an evaporator all piped in a closed series refrigerant circuit: a bypass pipe to conduct refrigerant around the condenser; valve means to reduce the refrigerant flow into the condenser during operation of the compressor, and pressure-responsive means to operate the valve, including a movable wall subjected on one side to a pressure corresponding to condenser pressure, to operate the valve means to reduce refrigerant flow to the condenser when condenser pressure falls, means connecting the opposite side of the wall to receive a pressure corresponding to evaporator outlet pressure, and yieldable force means acting on the wall in the same direction as evaporator pressure, and check valve means to prevent fluid from flowing through the bypass pipe from the upstream side of the expansion device to the upstream side of the condenser.

References Cited in the file of this patent

UNITED STATES PATENTS

| | | |
|---|---|---|
| 2,954,681 | McCormack | Oct. 4, 1960 |
| 2,986,899 | Schenk | June 6, 1961 |